United States Patent [19]

Heuwieser et al.

[11] Patent Number: 4,668,858
[45] Date of Patent: May 26, 1987

[54] METHOD AND DEVICE FOR ENTERING COORDINATES INTO AN AUTOMATIC NAVIGATION SYSTEM FOR VEHICLES

[75] Inventors: Erwin Heuwieser, Haar; Rüdiger Müller, Munich, both of Fed. Rep. of Germany

[73] Assignee: Siemens Aktiengesellschaft, Berlin and Munich, Fed. Rep. of Germany

[21] Appl. No.: 481,645

[22] Filed: Apr. 4, 1983

[30] Foreign Application Priority Data

Apr. 5, 1982 [DE] Fed. Rep. of Germany ....... 3212641

[51] Int. Cl.⁴ ............................................. G06K 7/10
[52] U.S. Cl. .................................. 235/472; 235/462; 235/491
[58] Field of Search ....................... 364/443, 444, 462; 235/454, 472, 494

[56] References Cited

U.S. PATENT DOCUMENTS

| | | | |
|---|---|---|---|
| 2,710,962 | 6/1955 | Fritze | 364/444 |
| 3,694,930 | 10/1972 | Howland | 364/443 |
| 4,420,682 | 12/1983 | Huber | 235/472 |
| 4,445,028 | 4/1984 | Huber | 235/494 |

FOREIGN PATENT DOCUMENTS 2077975 12/1981 United Kingdom .

Primary Examiner—Harold I. Pitts
Attorney, Agent, or Firm—Herbert L. Lerner; Laurence A. Greenberg

[57] ABSTRACT

Method for entering coordinates of starting and destination points into a navigation system for vehicles operating according to the principle of dead reckoning navigation, which includes representing the coordinates in a pattern with a bar code, and setting the coordinates into the navigation system with an optical or magnetic code reader, and a device for carrying out the method.

12 Claims, 2 Drawing Figures

METHOD AND DEVICE FOR ENTERING COORDINATES INTO AN AUTOMATIC NAVIGATION SYSTEM FOR VEHICLES

FIELD OF THE INVENTION

The invention relates to a method and a device for entering coodinates of starting and destination points into a navigation system for vehicles, operating according to the principle of compound navigation (dead reckoning navigation).

BACKGROUND OF THE INVENTION

Such navigation systems can be used for land, water and airborne vehicles. These systems work in accordance with the principle of dead reckoning navigation, in which a magnetic field probe disposed in the vehicle registers changes in direction with respect to the earth's magnetic field. By means of a suitable measuring device (such as a wheel sensor in land vehicles), the present position of the vehicle can therefore be calculated from a known starting point by continuous measurements of the distance travelled and the angle.

SUMMARY OF THE INVENTION

At the start of a trip, the user must enter coordinates of the starting and destination points into the equipment, coded in a suitable manner. These coordinates can be taken, for instance, from a land or sea map or a city map. After the coordinates are entered, a computer calculates the straight line distance to the destination and reproduces the latter on an indicating device, such as a display disposed in the vehicle. A compass rose, wind rose or dial card symbol which indicates the direction to the destination, for example, can furthermore be disposed on the indicating device.

Determining the coordinates of the starting and destination point carries with it certain difficulties. For this purpose, maps divided into squares can be used, for instance; but the inaccuracy in this case depends on the size of the grid squares and is maximally a $\sqrt{2}$ (where a is the side of a map square). However, the size of the map squares is too large in most maps for an exact guidance to the destination (for instance, for a city map with a scale 1:33,000, the side is 300 meters long, and the maximum inaccuracy is therefore $300\sqrt{2} \approx 420$ meters). While it is possible to determine the relative coordinates by measurement, such as with a ruler, this method is very cumbersome, time-consuming and cannot be expected of many users.

It is accordingly an object of the invention to provide a method and device for entering coordinates into an navigation system for vehicles, which overcomes the hereinafore-mentioned disadvantages of the heretofore-known devices of this general type, and in which the coordinates of the starting and destination point can be entered with sufficient accuracy into the system in a simple and reliable manner.

With the foregoing and other objects in view there is provided, in accordance with the invention, a method for entering coordinates of starting and destination points into a navigation system for vehicles operating according to the principle of dead reckoning navigation, which comprises representing the coordinates in a pattern with a bar code, and setting the coordinates into the navigation system with an optical or magnetic code reader.

In accordance with another mode of the invention, there is provided a method for entering coordinates of starting and destination points into a navigation system for vehicles having an optical or magnetic code reader and operating according to the principle of dead reckoning nagivation, the improvement which comprises representing the coordinates in a pattern with a bar code, and setting the coordinates into the navigation system with the optical or magnetic code reader.

In accordance with a further mode of the invention, there is provide a method which comprises providing the bar code on a map.

In accordance with an added mode of the invention, there is provided a method which comprises providing another bar code on the map perpendiculat to the first-mentioned bar code.

In accordance with an additional mode of the invention, there is provided a method which comprises providing the bar code on a transparent foil, and placing the foil over a map containing the starting and destination points.

In accordance with again another feature of the invention, there is provided a device for entering coordinates of starting and destination points into a navigation system for vehicles operating according to the principle of dead reckoning navigation, comprising a map having a bar code disposed thereon in a pattern representing the coordinates.

In accordance with again a further feature of the invention, the bar code is subdivided into individual grid squares.

In accordance with again an added feature of the invention, there is provided a device for entering coordinates of starting and destination points into a navigation system for vehicles operating according to the principle of dead reckoning navigation, comprising a transparent foil having a bar code disposed thereon in a pattern representing the coordinates.

In accordance with a concomitant feature of the invention, there is provided a map on which the transparent foil is disposed.

The advantage of the method and device of the invention is that the coordinates can be entered into the navigation system in a simple manner without the danger of the user making errors in entering the coordinates.

For entering, the reading equipment is merely guided over the map or transparent foil provided with the bar code in the direction from the starting point to the destination point. In the case of patterns which are subdivided into grid squares, it is sufficient to first pass over the grid square with the starting point and then over the grid square with the destination point.

Other features which are considered as characteristic for the invention are set forth in the appended claims.

Although the invention is illustrated and described herein as embodied in a method and device for entering coordinates into a navigation system for vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when

DESCRIPTION OF THE PREFERRED EMBODIMENTS

Figure 1:
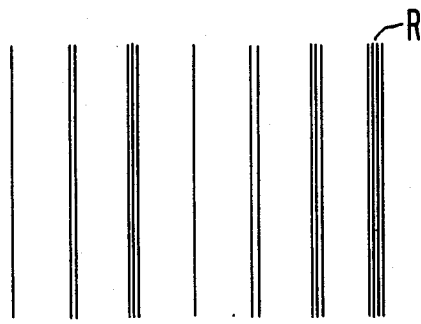
FIG. 1 is a diagrammatic top plan view of a raster with an unambiguous direction, which may be placed on a map.

Referring now to the figures of the drawing and first particularly to FIG. 1 thereof, there is seen an example of an optically or magnetically readable raster, which is disposed, for instance, on a map. The raster shown allows the identification of a direction (from left to right or vice versa) and has an identification of an edge R. A second distinguishable raster (for instance, color or coding, etc.) is preferably disposed on the map at right angles to the raster shown in FIG. 1. An optical or magnetic code reader sets the coordinates represented by the bar code into the navigation system. From the coordinates entered into the navigation system by means of the reading device, the distance from start to destination and the direction are calculated. The X and Y-directions can be read into the equipment in parallel (simultaneously) or serially (sequentially)

The raster can be impressed or applied to the map or it can be placed on the map in the form of transparent foils. The second embodiment has the advantaage of permitting the use of any map. However, it is necessary in such a case to provide a device at the equipment itself for setting the scale of the map into the equipment. In the case of rasters disposed directly on maps, the scale information can already be encoded in the raster or read out separately at a separate point (for instance, at the map margin).

Furthermore, instructions or a read-in process can be disposed at the margin of the map.

Figure 2:
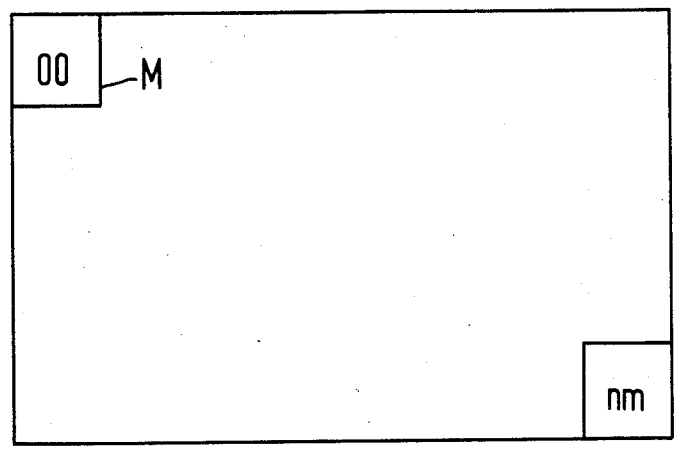
FIG. 2 is a diagrammatic top plan view of a map which is subdivided into grid squares for a grid square method.

In FIG. 2, an example is shown in which a map or foil that is subdivided into grid squares 00 to nm, is provided. In the individual grid quares, an edge marking M can be provided in which a characteristic number is encoded (this number may also be optionally readable separately). This permits the use of folded maps.

In an incremental raster, it is necessary to relinquish a grid square on the joints or corners. With appropriate coding of the raster, absolute information is also possible. In this case, reading-in of a characteristic number suffices in an extreme case. Correspondingly, special points on the map can also be marked (objects of interest, public buildings, etc.).

The foregoing is a description corresponding to German application No. P 32 12 641.7, dated Apr. 5, 1982, the International priority of which is being claimed for the instant application, and which is hereby made part of this application. Any discrepancies between the foregoing specification and the aforementioned corresponding German application are to be resolved in favor of the latter.

What is claimed is:

1. Method for entering coordinates of starting and destination points into a navigation system for vehicles operating according to the principle of dead reckoning navigation, which comprises representing the coordinates in a pattern with a bar code, and setting the coordinates into the navigation system with an optical or magnetic code reader.

2. In a method for entering coordinates of starting and destination points into a navigation system for vehicles having an optical or magnetic code reader and operating according to the principle of dead reckoning navigation, the improvement comprises representing the coordinates in a pattern with a bar code, and setting the coordinates into the navigation system with the optical or magnetic code reader.

3. Method according to claim 2, which comprises providing the bar code on a map.

4. Method according to claim 3, which comprises providing another bar code on the map perpendicular to the first-mentioned bar code.

5. Method according to claim 2, which comprises providing the bar code on a transparent foil, and placing the foil over a map containing the starting and destination points.

6. Device for entering coordinates of starting and destination points into a navigation system for vehicles operating according to the principle of dead reckoning navigation, comprising a map having a bar code disposed thereon in a pattern representing the coordinates.

7. Device according to claim 6, wherein said bar code is subdivided into individual grid squares.

8. Device for entering coordinates of starting and destination points into a navigation system for vehicles operating according to the principal of dead reckoning navigation, comprising a transparent foil having a bar code disposed thereon in a pattern representing the coordinates.

9. Device according to claim 8, including a map on which said transparent foil is disposed.

10. Device according to claim 6 comprising two sets of bar codes wherein the bars of the two sets are oriented along mutually perpendicular axes.

11. Device according to claim 10, comprising edge marks along the edges of the map, and wherein said perpendicular axes are parallel with the edges of the map.

12. Device according to claim 11, wherein the map is divided into squares by said edge marks, and wherein said edge marks are formed as bar codes.

* * * * *